United States Patent
Lai et al.

(10) Patent No.: US 10,555,234 B2
(45) Date of Patent: Feb. 4, 2020

(54) HANDOVER IMPROVEMENT FOR HIGH SPEED USER EQUIPMENT IN LTE

(71) Applicant: Telefonaktiebolaget LM Ericsson (publ), Stockholm (SE)

(72) Inventors: Xiaoming Lai, Ottawa (CA); Xixian Chen, Ottawa (CA); Weigang Li, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/293,982

(22) Filed: Oct. 14, 2016

(65) Prior Publication Data

US 2017/0034758 A1    Feb. 2, 2017

Related U.S. Application Data

(63) Continuation of application No. 13/964,503, filed on Aug. 12, 2013, now Pat. No. 9,578,583.

(51) Int. Cl.
*H04W 36/32* (2009.01)
*H04W 36/30* (2009.01)
(Continued)

(52) U.S. Cl.
CPC .......... *H04W 36/32* (2013.01); *H04W 4/027* (2013.01); *H04W 24/10* (2013.01); *H04W 36/30* (2013.01); *H04W 72/0413* (2013.01)

(58) Field of Classification Search
CPC ..... H04W 36/32; H04W 4/027; H04W 24/10; H04W 36/30; H04W 72/0413
See application file for complete search history.

(56) References Cited

U.S. PATENT DOCUMENTS 5,175,867 A    12/1992   Wejke et al.
7,151,756 B1   12/2006   Park et al.
(Continued)

FOREIGN PATENT DOCUMENTS

| EP | 1443787 A1 | 8/2004 |
| WO | 2013016300 A1 | 1/2013 |
| WO | 2013025539 A1 | 2/2013 |

OTHER PUBLICATIONS

Shooshtari, A. "Optimizing handover performance in Lte networks containing relays." Thesis submitted for examination for the degree of Master in Science in Technology, Aalto University—School of Electrical Engineering, Apr. 29, 2011, pp. 1-79.
(Continued)

*Primary Examiner* — Qun Shen
(74) *Attorney, Agent, or Firm* — Sage Patent Group

(57) ABSTRACT

Methods and apparatus are disclosed for handing over of a high-speed mobile terminal or user equipment from a source network node to a target network node. Reliable methods for measuring the speed of a moving user equipment are disclosed. Parameters used in a handover procedure are also adjusted in accordance with the speed of the user equipment. For handing over a high-speed user equipment, the present application discloses that the source network node can coordinate with the target network node and other candidate network nodes in transmitting a handover command to prevent handover failures.

14 Claims, 9 Drawing Sheets

(51) Int. Cl.
  *H04W 4/02* (2018.01)
  *H04W 24/10* (2009.01)
  *H04W 72/04* (2009.01)

(56) References Cited

U.S. PATENT DOCUMENTS

| | | | | |
|---|---|---|---|---|
| 2004/0147264 | A1* | 7/2004 | Ogawa | H04W 36/30 455/441 |
| 2005/0128969 | A1* | 6/2005 | Lee | H04W 36/32 370/313 |
| 2007/0155388 | A1* | 7/2007 | Petrovic | H04W 36/30 455/442 |
| 2008/0056218 | A1* | 3/2008 | Binzel | H04L 1/1874 370/342 |
| 2008/0233963 | A1* | 9/2008 | Alanara | H04W 12/06 455/438 |
| 2008/0267127 | A1* | 10/2008 | Narasimha | H04W 36/0077 370/331 |
| 2009/0061878 | A1* | 3/2009 | Fischer | G08C 17/02 455/436 |
| 2009/0176494 | A1 | 7/2009 | Lee et al. | |
| 2009/0201881 | A1* | 8/2009 | Chun | H04J 11/0069 370/331 |
| 2010/0093354 | A1 | 4/2010 | Agashe et al. | |
| 2010/0298001 | A1 | 11/2010 | Dimou et al. | |
| 2011/0086635 | A1 | 4/2011 | Grob-Lipski | |
| 2011/0188472 | A1* | 8/2011 | Jeon | H04W 36/0083 370/331 |
| 2011/0195706 | A1 | 8/2011 | Nakamori et al. | |
| 2011/0263262 | A1 | 10/2011 | Min et al. | |
| 2011/0287805 | A1 | 11/2011 | Kaminski et al. | |
| 2012/0076038 | A1* | 3/2012 | Shan | H04B 7/026 370/252 |
| 2012/0082058 | A1* | 4/2012 | Gerstenberger | H04W 36/00837 370/252 |
| 2012/0094670 | A1* | 4/2012 | Dimou | H04W 36/0083 455/436 |
| 2012/0190367 | A1 | 7/2012 | Nakamori et al. | |
| 2012/0202482 | A1 | 8/2012 | Katepalli et al. | |
| 2012/0263061 | A1* | 10/2012 | Reial | H04L 1/0023 370/252 |
| 2013/0023302 | A1* | 1/2013 | Sivanesan | H04W 36/32 455/525 |
| 2013/0171995 | A1 | 7/2013 | Fujishiro et al. | |
| 2013/0210422 | A1 | 8/2013 | Pani et al. | |
| 2014/0099962 | A1* | 4/2014 | Capdevielle | H04W 16/32 455/441 |
| 2014/0162652 | A1* | 6/2014 | Kang | H04W 36/32 455/436 |
| 2014/0335861 | A1* | 11/2014 | De Benedittis | H04W 36/0061 455/436 |

OTHER PUBLICATIONS

Hussein Y. et al. "Enhanced handover mechanism in long term evolution (LTE) networks." Scientific Research and Essays, vol. 6(24), Oct. 23, 2011, pp. 5138-5152.

Legg, P. et al. "A simulation study of LTE intra-frequency handover performance." 2010 IEEE 72nd Vehicular Technology Conference Fall (VTC 2010—Fall), Sep. 6-9, 2010, pp. 1-5, Ottawa, ON.

3rd Generation Partnership Project. "3rd Generation Partnership Project; Technical Specification Group Radio Access Network; Evolved Universal Terrestrial Radio Access (E-UTRA) Radio Resource Control (RRC); Protocol specification (Release 9)." 3GPP TS 36.331, V9.0.0, Sep. 2009, pp. 1-213, Sophia Antipolis Valbonne, France.

3rd Generation Partnership Project. "3rd Generation Partnership Project; Technical Specification Group Radio Access Network; Evolved Universal Terrestrial Radio Access (E-UTRA); User Equipment (UE) procedures in idle mode (Release 9)." 3GPP TS 36.304, V9.0.0, Sep. 2009, pp. 1-30, Sophia Antipolis Valbonne, France.

First Examination Report dated Nov. 22, 2019 for Indian Patent Application No. 201637003713, 6 pages.

* cited by examiner

HANDOVER IMPROVEMENT FOR HIGH SPEED USER EQUIPMENT IN LTE

RELATED APPLICATION

This application is a continuation of U.S. patent application Ser. No. 13/964,503, filed Aug. 12, 2013, the disclosure of which is incorporated herein by reference in its entirety.

TECHNICAL FIELD

The present invention relates generally to handover of a UE (user equipment) in an LTE network and, more specifically, to methods and apparatus for improving handover for high speed UEs in an LTE network.

BACKGROUND

In a wireless communications network, when a UE moves away from a first cell and into a second cell, handover of the UE from the serving node of the first cell to the serving node of the second cell is necessary. A handover decision is generally made by the serving node of a UE based on measurement results reported by the UE. Parameters controlling the measurement reports from a UE, such as how often the UE reports and what types of measurements to report, are also configured by the serving node.

When a UE moves at a high speed, the regular handover procedure often does not work well, due to incorrect estimate of the speed of the UE, degraded channel conditions experienced by the UE, and insufficient time for the UE to perform and report measurement results.

One existing method for measuring the speed of a UE is to count the number of handovers the UE has experienced in a given time period. Such method is based on the assumption that base stations or eNBs (evolved NodeBs) are distributed evenly, an assumption that may not always hold true. Another problem with such method is that the UE may experience a sudden change of speed, for example, when entering a highway. In such case, the speed of the UE estimated based on its handover history would not accurately reflect the new speed of the UE. As a result, the regular handover procedure designed for a UE moving at a normal speed may fail to work properly for a UE moving at a high speed. Calls may drop as a result.

A high speed UE also experiences rapidly degrading channel conditions because of the strong interference from neighboring cells, especially the cell the UE is moving towards (i.e., the target cell). Because of the high speed, the UE may have insufficient time to report measurement results, send a handover request, and decode a received handover command before the UE moves out of the current serving cell. Because of the degraded channel conditions, the high-speed UE may fail to receive the handover command from the serving cell.

There is a need for improving regular handover procedures to accommodate high-speed UEs. The present application discloses robust handover methods and apparatus that reduce call drops and handover failures during handover of high speed UEs.

SUMMARY

The present invention relates to improvements in handover procedures designed for high speed UEs or wireless devices.

In some embodiments, a method of handing over a high-speed wireless device is disclosed. The wireless device is moving at a high speed from a source base station to a target base station. The method is implemented on the source base station. The method comprises measuring a speed of the wireless device and estimating a channel quality based on a channel quality index report from the wireless device. The method further comprises signaling one or more candidate base stations to coordinate with the source base station for transmitting a handover command to the wireless device depending on the measured speed and the estimated channel quality. In the embodiments, the one or more candidate base stations are included in a recent measurement report from the wireless device. The one or more candidate base stations include the target base station.

In some embodiments, a source network node is configured to perform a method of handing over a high-speed wireless device from the source network node to a target network node. The source network node comprises a transceiver, a network interface, and a processing circuit. The transceiver is configured for transmitting and receiving signals to and from a wireless device. The network interface is configured for communicating with one or more candidate network nodes. The one or more network nodes are included in a recent measurement report. The processing circuit is configured to measure the speed of the wireless device and estimate a channel quality based on a channel quality report from the wireless device. The processing circuit is further configured to signal the one or more candidate network nodes to coordinate with the source network node for transmitting a handover command to the wireless device based on the measured speed and the estimated channel quality.

In some embodiments, a method implemented on a wireless device located in a wireless communications network is disclosed. The method is implemented for the wireless device to perform a handover from a source network node to a target network node. The method comprises measuring a channel quality for a channel between the source network node and the wireless device and reporting the measured channel quality to the source network node. The method further comprises receiving a handover command from the source network node, or the target network node, or a candidate network node other than the target network node. The handover command directs the wireless device to hand over from the source network node to the target network node. Upon receiving the handover command, the wireless device sends an acknowledgement for the received handover command to the source network node and starts a handover procedure.

In some embodiments, a wireless device configured to perform a handover procedure from a source network node to a target network node comprises a transceiver and a processing circuit. The transceiver is for transmitting and receiving signals to and from the source network node and the target network node. The processing circuit is configured to measure a channel quality for a channel between the source network node and the wireless device and report the measured channel quality to the source network node. The processing circuit is further configured to receive a handover command from the source network node, or the target network node, or a candidate network node other than the target network node. The handover command directs the wireless device to move from the source network node to the target network node. The process circuit is further configured to send an acknowledgement for the received handover command to the source network node and start a handover procedure upon receiving the handover command.

DETAILED DESCRIPTION

Figure 1:
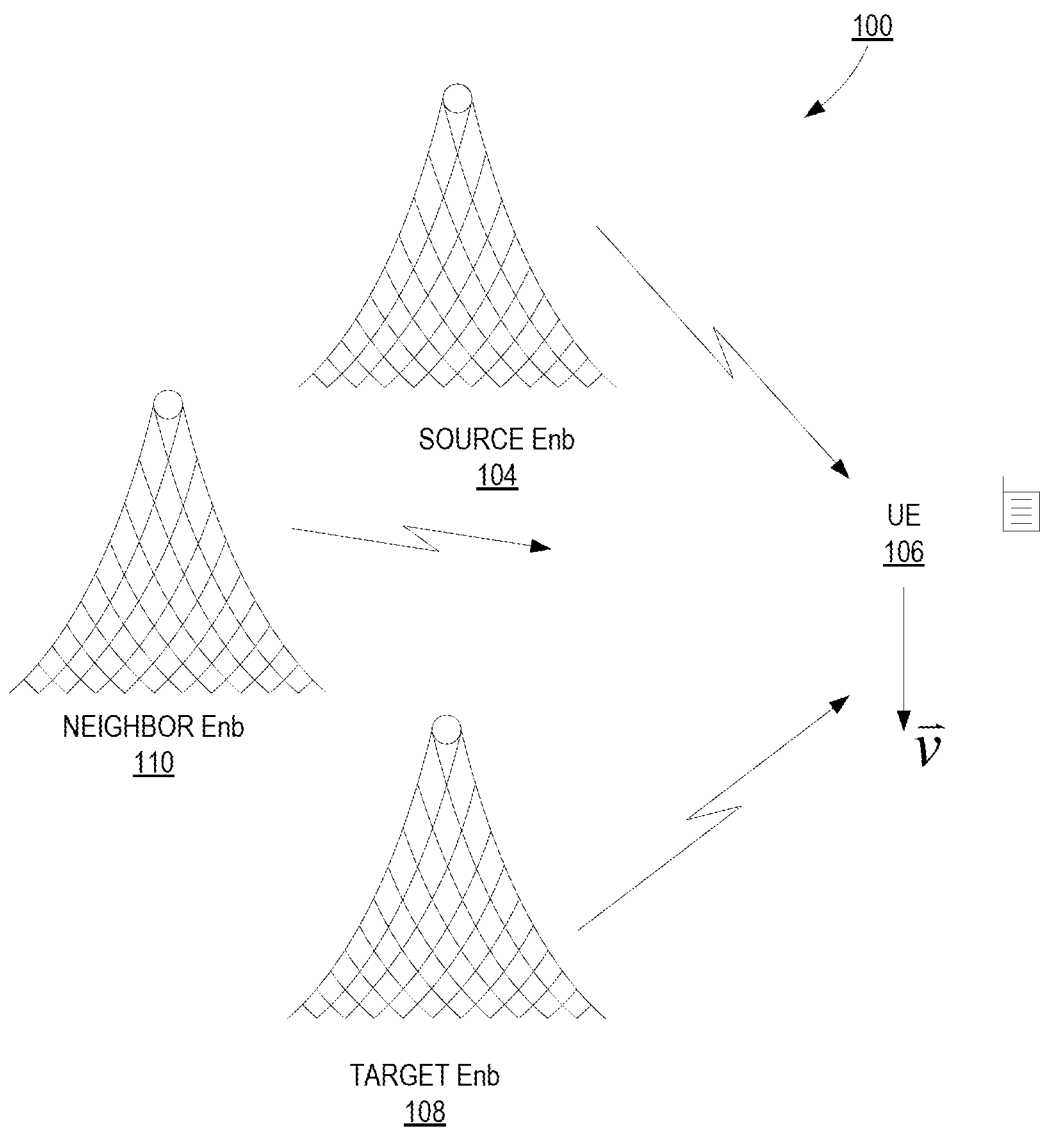
FIG. 1 illustrates an exemplary wireless network.

In FIG. 1, a wireless network 100 comprising several base stations or eNBs, 104, 108, and 110, is shown. In the present disclosure, terms such as eNB, base station, and cell are treated as synonyms and are used interchangeably. In the wireless network 100, a UE (user equipment) 106 is moving away from the eNB 104 and moving towards the eNB 108. As the UE 106 moves closer to the eNB 108, the signals from the eNB 108 become stronger and the signals from the eNB 104 become weaker. Eventually, the UE 106 is handed over from the eNB 104 to the eNB 108. In describing the handover procedure, the eNB 104 is referred to as the source eNB and the eNB 108 is referred to as the target eNB. The third eNB 110, along with other eNBs in the vicinity (not shown), is referred to as neighbor eNBs.

Figure 2:
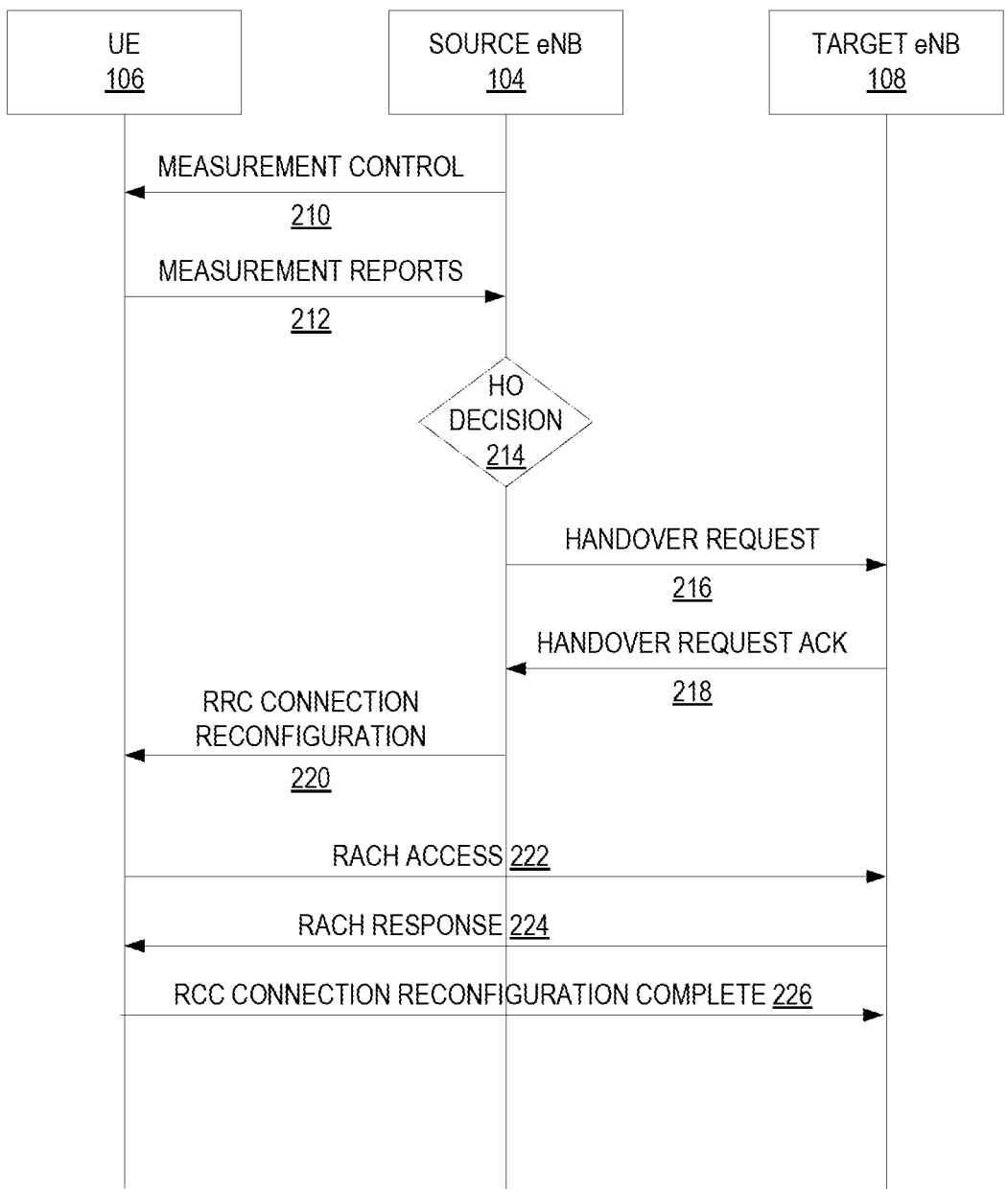
FIG. 2 is a flow chart illustrating an exemplary handover procedure.

FIG. 2 illustrates an exemplary procedure of handing the UE 106 over from the source eNB 104 to the target eNB 108. When the UE 106 is served by the source eNB 104, the source eNB 104 configures the UE 106 for reporting measurement results (step 210). For example, the source eNB 104 may set the time when the UE 106 needs to report measurement results, which may be defined by parameter TimeToTrigger value (TTTV). The source eNB 104 may set the criterion that triggers the reporting of measurement results by the UE 106. The criterion may be defined by parameter a3offset. Other parameters include filterCoefficient value (FCV) and hysteresis. FCV specifies the measurement filtering coefficient, and hysteresis is a parameter used to ensure that the target neighbor cell is indeed a better cell for the UE to be handed over from the current cell. These parameters and others used by the source eNB 104 to configure measurement reports by the UE 106 are referred herein as handover parameters.

Once the UE 106 has been configured by the source eNB 104, the UE 106 reports its measurement results (step 212). Based on the measurement reports from the UE 106, the eNB 104 makes the handover decision, i.e., whether to hand over the UE 106 to the target eNB 108 (step 214). The source eNB 104 sends a handover request to the target eNB 108 (step 216). In response, the target eNB 108 sends a handover request acknowledgement (ACK) to the source eNB to acknowledge the handover request (218). The source eNB 104 then sends an RRC_Connection_Reconfiguration message to the UE 106 (step 220). The UE 106 interprets the received RRC_Connection_Reconfiguration message as a handover command and starts accessing the target eNB 108 using a random access channel (RACH). The UE 106 sends a RACH Access message to the target eNB 108 (step 222) and receives a RACH Response from the target eNB 108 (step 224). In turn, the UE 106 sends an RRC_Connection_Reconfiguration_Complete message to the target eNB (108) to confirm that the handover is complete and the target eNB 108 can start transmitting data to the UE 106.

As discussed above, handover parameters are configured by the source eNB 104. When the handover parameters are not set properly, it can cause handover failures, dropped calls, or the so-called ping-pong handover scenario. For example, if TTTV is too short, the UE 106 may report measurement results too frequently, and fluctuations in channel conditions could cause a UE 106 located in the overlapping region of two neighboring cells to be handed over back and forth, i.e., a ping-pong handover. If TTTV is too long, the UE 106 may wait too long to report its measurement results. By the time a handover decision is made by the source eNB 104, the signal from the source cell may have become too weak and the call may be dropped as a result.

In most cases, the handover parameters can be set to some proper values to ensure that the handover procedure works well. However, handover parameters properly configured under normal conditions may cause problems when a UE 106 is moving at a high speed. For example, the TTTV may be too long compared to how long it takes a UE 106 to move across a cell. One solution is to adjust the handover parameters based on the speed of the UE 106, as shown in FIG. 3.

Figure 3:
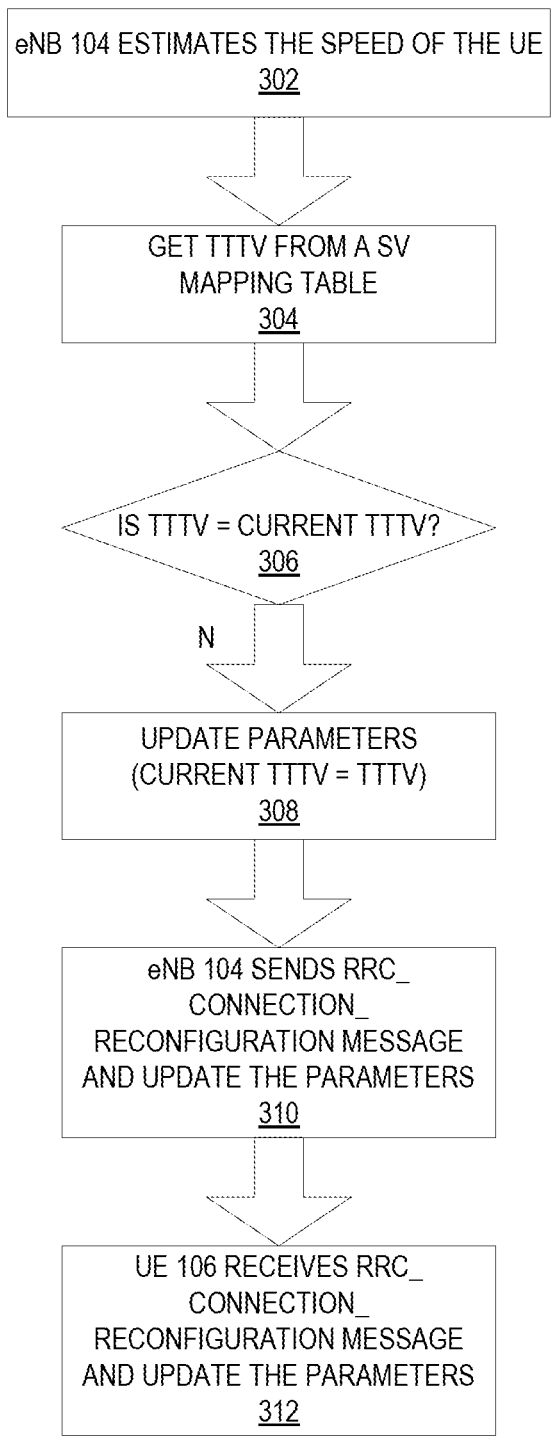
FIG. 3 is a flow chart illustrating an exemplary method of configuring a handover procedure based on the speed of a moving UE estimated by an eNB.

FIG. 3 illustrates a flow chart of an exemplary method for configuring a handover procedure. The speed of the UE 106 is first estimated by the source eNB 104 (step 202). The estimated speed of the UE 106 is then used to retrieve a TTTV parameter from a speed-value mapping table (step 304). The speed-value mapping table stores a mapping of different TTTV parameters to different speed values of the UE 106. The eNB 104 compares the retrieved TTTV parameter to the current TTTV parameter (step 306). If the two parameters are not equal, the eNB 104 updates the current TTTV parameter with the retrieved TTTV parameter (step 310). The eNB 104 also sends a RRC_Connection_Reconfiguration message to the UE 106 to re-configure the handover parameters (step 312). Upon receiving the message, the UE 106 updates its handover parameters (step 314). In the above description, parameter TTTV is used as an example of handover parameters. Other handover parameters, such as a3offset, etc., can be adjusted according to the speed of the UE in the same way as described above.

Figure 4:
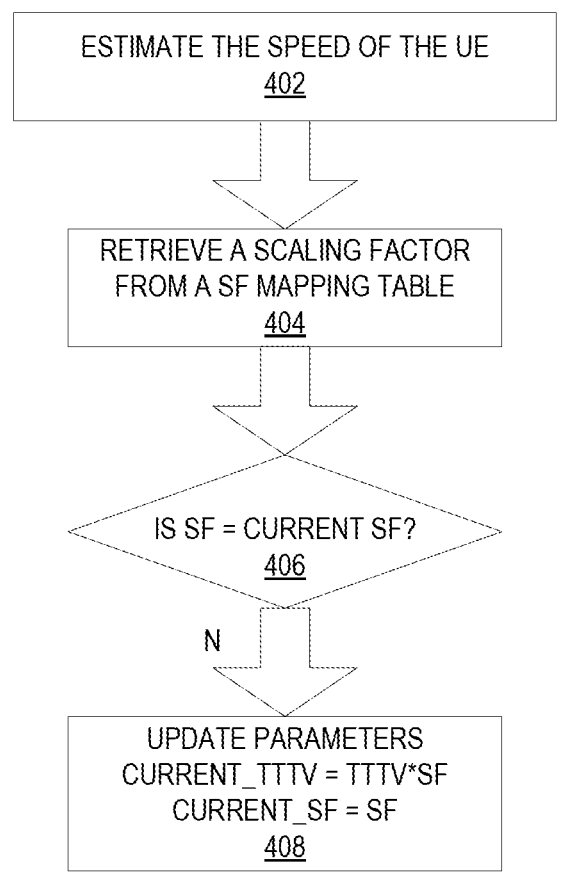
FIG. 4 illustrates an exemplary method of configuring a handover procedure based on the speed of a moving UE estimated by the UE.

FIG. 4 illustrates a different embodiment for updating handover parameters based on the estimated speed of the UE 106. In FIG. 4, the speed of the UE 106 is first estimated by the UE 106 itself (step 402). Based on the estimated speed, the UE 106 retrieves a scaling factor from a mapping table (step 404). The mapping table may be a pre-stored file that maintains a mapping between different scaling factors and different speed values. The retrieved scaling factor is used to scale the handover parameters, e.g., the TTTV parameter. After retrieving the scaling factor, the UE 106 compares the scaling factor to the current scaling factor it maintains (step 406). If the retrieved scaling factor is not the same as the current scaling factor, the UE 106 updates the TTTV parameter by applying the retrieved scaling factor (Step 408).

In some embodiments, the speed of the UE 106 may be measured using a GPS device. In some embodiments, the speed of the UE 106 may be measured based on Doppler shift or time adjustment value. A time adjustment value is used to keep a UE 106 time-aligned with the serving eNB. When a UE 106 initially accesses a radio network served by an eNB, the UE 106 adjusts its transmission timing to be time-aligned with the eNB. After the radio connection between the UE 106 and the eNB has been established, the transmission timing of the UE 106 needs to be adjusted frequently to keep the UE 106 and the eNB in sync. For example, the eNB may send a time adjustment value in a time adjustment command to the UE 106 to adjust the UE's timing. The time adjustment value reflects the varying propagation delay experienced by signals transmitted from the UE 106 to the eNB. One reason that causes the propagation delay to vary is that the UE 106 is either moving towards or away from the eNB. Therefore, a time adjustment value can be used to estimate the speed of a UE in certain scenarios.

In both FIG. 3 and FIG. 4, the estimated speed value is used to update or reconfigure the handover parameters. In some embodiments, the speed value of a UE 106 may be classified as LOW, MEDIUM, and HIGH. A set of handover parameters may be pre-determined for each of the three classes. Depending on the classification of the speed value of the UE 106, the corresponding set of handover parameters is selected by either the UE 106 or the eNB 104 for updating the UE's handover parameters. Because there are only three classes, the selected handover parameters are not necessarily the best choice for the speed of the UE 106. Using a mapping table allows selected handover parameters to better match to the speed value of the UE 106.

In the above described embodiments, the source eNB 104 adjusts handover parameters based on the speed of the UE 106 to improve handover performance and reduce handover failures. Handover performance may be improved in other ways. In some embodiments, the source eNB 104 may signal the target eNB 108 to request the target eNB 108 to coordinate with the source eNB 104 for transmission of handover commands to the UE 106. In some embodiments, the source eNB 104 may signal all candidate eNBs, for example, the target eNB 108 and neighbor eNB 110, to coordinate with the source eNB 104 for transmission of handover commands to the UE 106.

Figure 5:
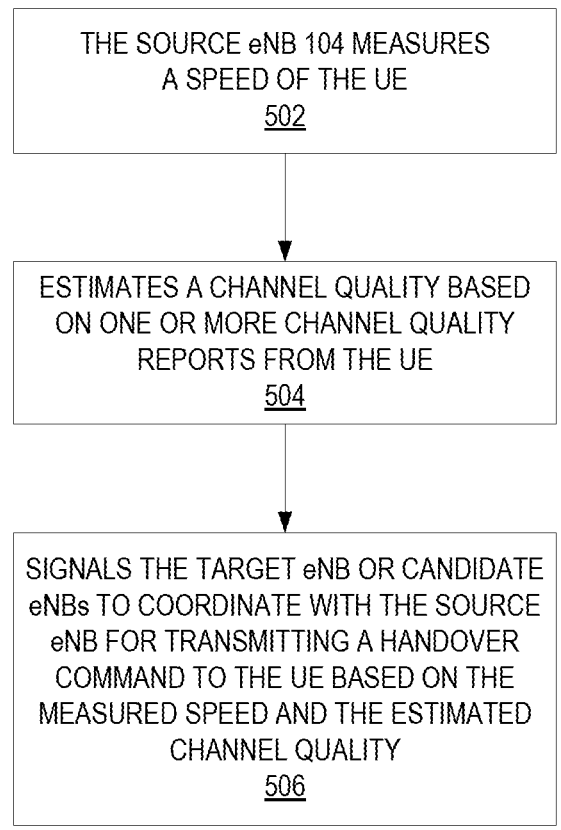
FIG. 5 is a flow chart illustrating an improved handover procedure.

FIG. 5 describes an exemplary handover process during which the source eNB 104 coordinates with the target eNB 108 or all candidate eNBs to ensure that a handover command is received by the UE 106.

In FIG. 5, the source eNB 104 receives one or more measurement reports from the UE 106 on the pilot strengths of neighboring eNBs. The target eNB 108 is selected based on the most recent measurement reports from the UE 106. The source eNB 104 also measures the speed of the UE 106 (step 502) and estimates a channel quality based on one or more channel quality index (CQI) reports from the UE 106 (step 504). Based on the measured speed of the UE 106 and the estimated channel quality, the source eNB 104 signals the target eNB 108 or all candidate eNBs to coordinate with the source eNB 104 for transmitting a handover command to the UE (step 506). In some embodiments, to coordinate with the source eNB 104, the target eNB 108 turns off its transmission on certain resource elements during a particular transmission time interval (TTI). In other embodiments, all candidate eNBs may turn off their transmissions on certain resource elements. Alternatively, in some embodiments, both the target eNB 108 and the source eNB 104 transmit a handover command to the UE 106 to ensure that the UE 106 indeed receives the handover command. In other embodiments, all candidate eNBs and the source eNB 104 transmit a handover command to the UE 106.

Figure 6:
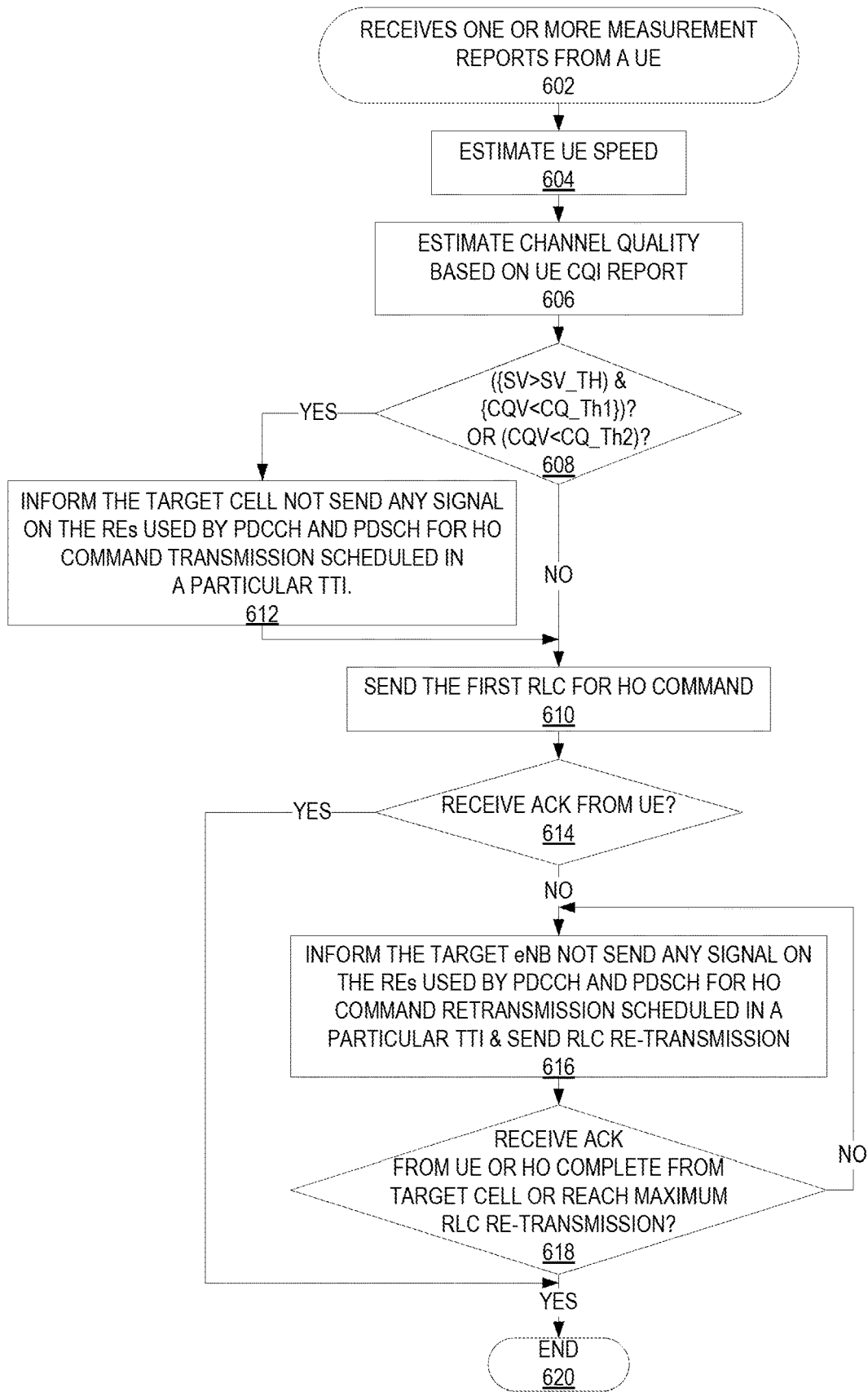
FIG. 6 illustrates a first embodiment of an improved handover procedure.
Figure 7:
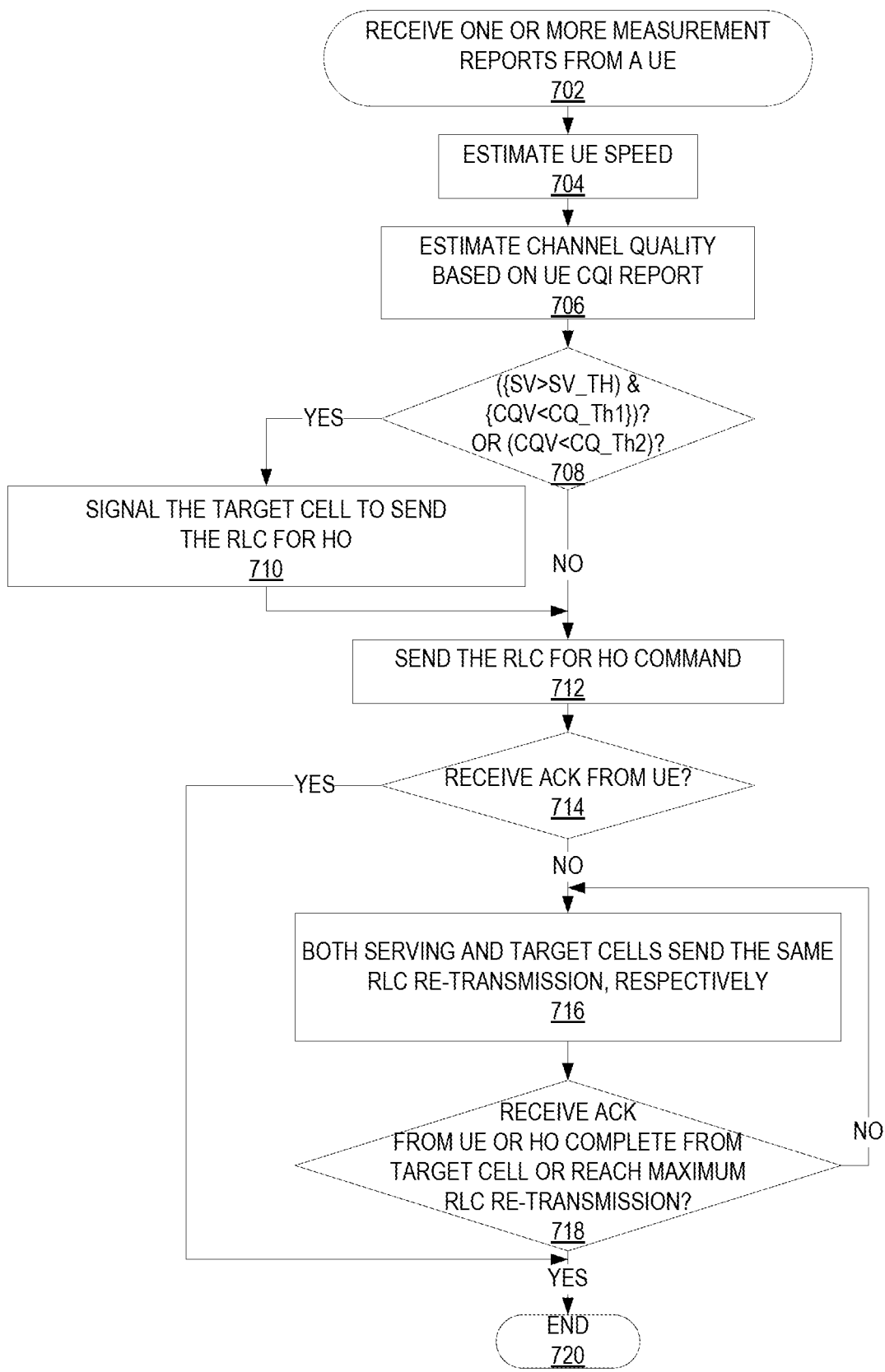
FIG. 7 illustrates a second embodiment of an improved handover procedure.

As examples, FIGS. 6 and 7 illustrate two processes of the source eNB 104 coordinating with the target eNB 108 in transmitting a handover command to the UE 106. FIG. 6 illustrates a process in which the target eNB 108 turns off its transmission to assist the source eNB 104 in transmitting the handover command. The source eNB 104 receives one or more measurement reports from the UE 106 (step 602). The source eNB 104 also estimates the speed of the UE 106 (step 604) and estimates a channel quality based on the channel quality index (CQI) report from the UE 106 (step 606). Based on the speed of the UE 106 and the channel quality, the source eNB 106 determines whether to signal the target eNB 108 to coordinate in the handover command transmission (step 608).

If it is determined that (1) the speed of the UE 106 is larger than a speed threshold and that the channel quality is smaller than a first channel quality threshold, or (2) the channel quality threshold is smaller than a second channel quality threshold, the source eNB 106 signals the target eNB 108 and requests the target eNB 108 that it stop transmission on the resource elements (REs) that are used to transmit a handover command by the source eNB 106. For example, control channel elements (CCEs) on a physical downlink control channel (PDCCH) may be used for transmission of control information of a handover command during a particular transmission time interval (TTI) (step 612). In the meantime, the source eNB 104 transmits a handover command using a radio link control (RLC) message on a physical downlink shared channel (PDSCH) to the UE 106 during the same III (step 610). If it is determined otherwise, the source eNB 104 simply transmits a handover command to the UE 106 without involvement of the target eNB 108 (step 610). After transmitting the handover command to the UE 106, the source eNB 104 waits for an acknowledgement (step 614).

If the source eNB 104 does not receive an acknowledgement from the UE 106, the source eNB 104 informs the target eNB 108 to turn off its transmission on the resource elements used by the PDCCH CCEs and PDSCH for retransmission of the control information of a handover commands during a particular TTI. The source eNB 108 then attempts retransmission of a handover command (step 616). The source eNB 108 then again waits for an acknowledgement (618). The source eNB 108 attempts a pre-determined maximum number of retransmissions if no acknowledgement is received from the UE 106. The procedure ends when the source eNB 104 receives an acknowledgement from the UE 106 or the maximum number of retransmissions has reached (step 620). The procedure may also end when the target eNB 108 receives a RRC_Connection_Reconfiguration_Complete message from the UE.

In FIG. 6, the target eNB 108 turns off its transmission on certain resource elements when the source eNB 104 is transmitting a handover command to the UE 106. Because the interference caused by the transmissions from the target eNB 108 is eliminated or mitigated, there is a better chance for the UE 106 to receive and decode the handover command. As described above, because a high-speed UE often experiences degraded channel conditions due to interference from neighboring cells, especially the target cell, turning off transmissions by the target eNB 108 on certain resource elements during a particular TTI improves the channel condition during the time period the handover command is transmitted by the source eNB 104.

Alternatively, the target eNB 108 may be asked by the source eNB 104 to transmit a handover command to the UE 106, in addition to the handover command sent by the source eNB 104, as shown in FIG. 7.

FIG. 7 illustrates another exemplary handover procedure. In the method shown in FIG. 7, the source eNB 104 receives one or more measurement reports from the UE 106 (step 702), estimates the speed of the UE 106 (step 704), and estimates a channel quality based on the channel quality index report (step 706). The source eNB 106 determines whether the speed of the UE 106 is larger than a speed value threshold and the channel quality is smaller than a first channel quality threshold, or whether the channel quality is smaller than a second channel quality threshold (step 708). If yes, the source eNB 104 signals the target eNB 106 to send a handover command to the UE 106 using a radio link control (RLC) message (step 710).

In some embodiments, after receiving the request from the source eNB for sending a handover command, the target eNB 108 will transmit the handover command to the UE 106 using a special cell radio network temporary identifier (C-RNTI) reserved for handover coordination only. The special C-RNTI plus the control information is transmitted on a physical downlink control channel (PDCCH) and the handover command plus the identifier of the UE 106 is transmitted on a physical downlink shared channel (PDSCH). On the side of the UE 106, the UE 106 first tries to decode the control information transmitted on the PDCCH of the target eNB. If successfully, the UE 106 will check if the special temporary identifier used for the handover is included in the PDCCH or not. If yes, the UE 106 will use the decoded control information to decode the handover command plus the UE identifier on the PDSCH. If the UE 106 successfully decodes the handover command plus its UE identifier, it will use the target eNB information contained in the handover command to start accessing the target eNB 108 using a random access channel (RACH).

The source eNB 104 also sends a handover command to the UE 106 (step 712) and waits for an acknowledgement from the UE 106. On the side of the UE 106, the UE 106 first tries to decode the control information transmitted on the PDCCH. If successfully, the UE 106 will check if its temporary identifier (which is assigned by the source eNB during the call set-up) is included in the PDCCH or not. If yes, the UE uses the decoded control information to decode the handover command on the PDSCH and use the information about the target eNB 108 contained in the handover command to start accessing the target eNB 108 using a random access channel (RACH). The acknowledgment from the UE 106 may be in response to the handover command sent by either the source eNB 104 or the target eNB 106. If the source eNB 104 does not receive an acknowledgement from the UE 106, the source eNB 104 will signal the target eNB 108 to retransmit the handover command. Both the source eNB 104 and the target eNB 108 retransmit the radio link control message to resend the handover command, until an acknowledgement is received from the UE 106 or the maximum number of retransmissions has been reached (step 718). In either case, the transmission of handover commands terminates (step 720). The transmission of handover commands may also terminate when the target eNB 108 receives a RRC_Connect_Reconfiguration_Complete message from the UE 106.

In some embodiments, the target eNB 108 may be configured to re-transmit the handover command without any explicit command from the source eNB 104. The target eNB 108 will continue to retransmit until the source eNB 104 signals it to stop, which may take place when the source eNB 104 receives an acknowledgement from the UE 106. In some embodiments, the target eNB 108 may be configured to attempt retransmission of the handover command for a pre-determined number of times.

In FIGS. 6 and 7, the source eNB 104 is coordinating with the target eNB 108 to ensure that the UE 106 receives a handover command. In some embodiments, the source eNB 104 may be configured to coordinate with all candidate eNBs, e.g., eNB 108 and eNB 110, included in the most recent measurement report received by the source eNB 104 from the UE 106.

For example, the source eNB 104 may request all candidate eNBs to transmit a handover command to the UE 106. After receiving the request from the source eNB 104 for sending a handover command, all candidate eNBs transmit the handover command to the UE using a special cell radio network temporary identifier (C-RNTI) reserved for handover coordination. The special C-RNTI plus the control information is transmitted on their PDCCHs, respectively. The handover command plus the identifier of the UE 106 is transmitted on their PDSCHs, respectively. This process is repeated until one of the following conditions are met: (1) the source eNB receives an acknowledgement from the UE; (2) one of the candidate eNBs receives the RRC_Connection_Reconfiguration_Complete message from the UE; and (3) the number of the retries reaches the pre-defined maximum number of retransmission of the handover command.

On the side of the UE 106, it decodes the handover commands from the serving eNB as well as from all the candidate eNBs. The procedure for decoding the handover commands from all the candidate eNBs is similar to from the target eNB described before. The UE 106 first tries to decode the control information transmitted on the PDCCH of each candidate eNB. If successfully, the UE 106 will check if the special temporary identifier used for the handover is included in the PDCCH or not. If yes, the UE 106 will use the decoded control information to decode the handover command plus the UE identifier on the PDSCH. If the UE 106 successfully decodes the handover command plus its UE identifier, it will use the target eNB information contained in the handover command to start accessing the target eNB 108 using a random access channel (RACH).

In the above descriptions, eNBs are used as an example of a network node that handles the handover procedure of a UE 106. The same methods and techniques can be implemented on other types of network nodes that serve a cell or sector of a cell.

Figure 8:
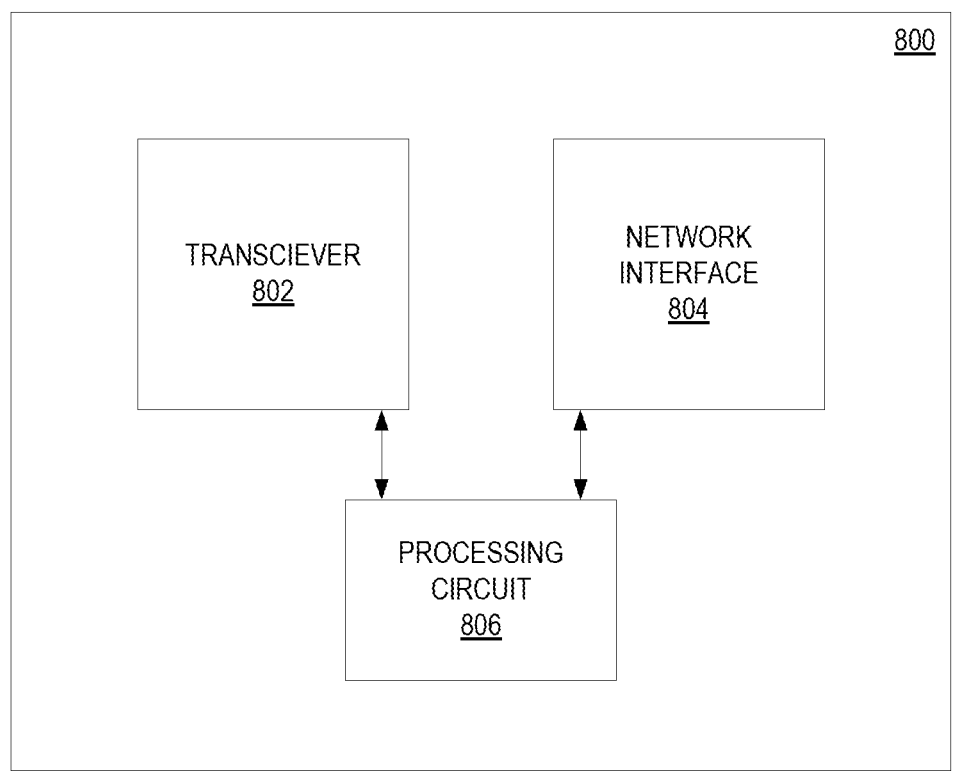
FIG. 8 illustrates an exemplary network node configured to support the improved handover procedures disclosed herein.

FIG. 8 is a block diagram illustrates an exemplary network node configured to perform the methods and techniques described above. The network node in FIG. 8 comprises a transceiver 802, a network interface 804 and a processing circuit 806. The transceiver 802 is configured to transmit signals to and receive signals from one or more UEs. The network interface 804 is configured to communicate with other network nodes. The processing circuit 806 is configured to measure the speed of a UE, e.g., the UE 106, using, for example, Doppler shift or time adjustment value, and estimate a channel quality based on one or more channel quality reports sent by the UE. The processing circuit 806 is also configured to signal another network node to coordinate with the network node 800 for transmitting a handover command to the UE, based on the measured speed and the estimated channel quality.

In some embodiments, the network node 800 may be configured as the source eNB 104 or the target eNB 108. When configured as the target eNB 108, the processing circuit 806 may receive and process a signal from another network node that requests the network node 800 to coordinate in transmitting a handover command to a designated UE.

Figure 9:
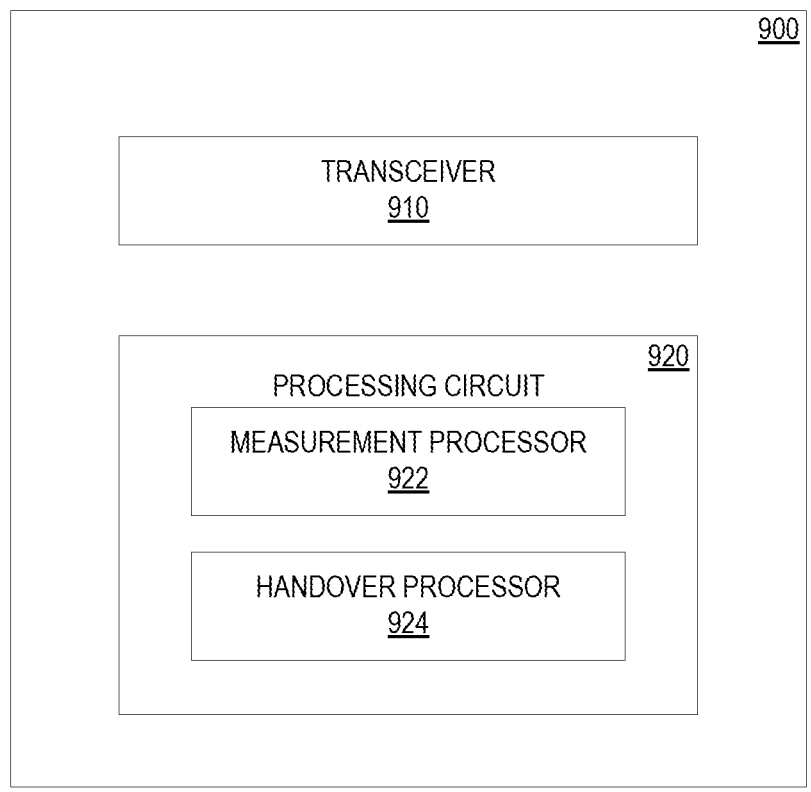
FIG. 9 illustrates an exemplary wireless device configured to support the improved handover procedures disclosed herein.

FIG. 9 illustrates an exemplary UE 900 configured to perform the above described handover procedure. The UE 900 comprises a transceiver 910 and a processing circuit 920. The transceiver 910 is configured for transmitting and receiving signals to and from multiple network nodes, e.g., eNB 104, eNB 108, and eNB 110. The processing circuit 920 comprises a measurement processor 922 which is configured to measure a channel quality for a channel between the UE 900 and the source network node, e.g., eNB 104, and to report the measured channel quality to the source network node. The measurement processor 922 is also configured to measure the pilot strengths of the serving and all the candidate cells and to report them in a measurement report message when certain condition is met. The processing circuit 920 also comprises a handover processor 924 configured to receive a handover command from multiple network nodes. Upon receiving a handover command, the handover processor 924 sends an acknowledgement to the source network node for the received handover command and commences a handover procedure. If the UE 900 does not receive a handover command or can't decode the handover command successfully for a certain time period, it will start a random access procedure to establish a radio connection with the target eNB 108.

The present invention may be carried out in other specific ways than those herein set forth without departing from the scope and essential characteristics of the invention. One or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive, and all changes coming within the meaning and equivalency range of the appended claims are intended to be embraced therein.

What is claimed is:

1. A method of handing over a wireless device moving at a high speed from a source base station to a target base station, comprising:
measuring a speed of the wireless device;
estimating a channel quality based on a channel quality index report from the wireless device;
depending on the measured speed and the estimated channel quality, signaling one or more candidate base stations to coordinate with the source base station for transmitting a handover command to the wireless device,
wherein the signaling requests each of the one or more candidate base stations to transmit the handover command to the wireless device for handing over the wireless device from the source base station to the target base station,
wherein the one or more candidate base stations include at least one base station other than the target base station and are included in a recent measurement report from the wireless device,
wherein signaling the one or more candidate base stations to coordinate with the source base station for transmitting a handover command based on the measured speed and the estimated channel quality comprises signaling each of the one or more candidate base stations to coordinate with the source base station when the measured speed value is larger than a predetermined speed threshold and the estimated channel quality value is lower than a first predetermined channel quality threshold, and
wherein signaling the one or more candidate base stations to coordinate with source base station for transmitting a handover command to the wireless device comprises signaling all of the one or more candidate base stations to transmit a handover command to the wireless device using a special cell radio network temporary identifier (C-RNTI) based on the measured speed value and the estimated channel quality;
transmitting a handover command to the wireless device; and
if no acknowledgement is received from the wireless device or no handover complete message received from the target base station, re-signaling each of the one or more candidate base stations to transmit a handover command to the wireless device and re-transmitting a handover command to the wireless device.

2. The method of claim 1, wherein signaling the one or more candidate base stations to coordinate with the source base station for transmitting a handover command based on the measured speed and the estimated channel quality comprises signaling each of the one or more candidate base stations to coordinate with the source base station when the estimated channel quality value is lower than a second predetermined channel quality threshold.

3. The method of claim 1, wherein measuring the speed of the wireless device comprises measuring the speed of the wireless device using one of Doppler shift, time delay variation, uplink (UL) reference signal, and channel quality index (CQI) report.

4. The method of claim 1, further comprising:
receiving a measurement report from a wireless device before measuring the speed of the wireless device; and
based on the speed of the wireless device, adjusting one or more configuration parameters for use by the wireless device to send measurement reports.

5. The method of claim 4, wherein the one or more parameters for use by the wireless device to report measurement reports comprise one or more of time to trigger value, filter coefficient value, a3offset value, and hysteresis.

6. The method of claim 4, wherein adjusting the one or more configuration parameters based on the estimated speed of the wireless device comprises:
mapping the estimated speed of the wireless device to a scaling factor; and
applying the scaling factor to the one or more configuration parameters to obtain scaled parameters.

7. A source network node in a wireless communications system, comprising:
- a transceiver for transmitting and receiving signals to and from a wireless device;
- a network interface for communicating with one or more candidate network nodes,
- wherein the one or more candidate network nodes are included in a recent measurement report;
- a processing circuit configured to:
  - measure a speed of the wireless device;
  - estimate a channel quality based on a channel quality report from the wireless device; and
  - based on the measured speed and the estimated channel quality, signal the one or more candidate network nodes to coordinate with the source network node for transmitting a handover command to the wireless device,
    - wherein the signal requests each of the one or more candidate base stations to transmit the handover command to the wireless device for handing over the wireless device from the source network node to a target network node,
    - wherein the one or more candidate network nodes include at least one network node other than the target network node and are included in a recent measurement report from the wireless device, and
    - wherein to signal the one or more candidate network nodes to coordinate with the source network node, the processing circuit is further configured to signal each of the one or more network nodes to transmit a handover command to the wireless device using a cell radio network temporary identifier (C-RNTI) based on the measured speed value and the estimated channel quality;
  - transmit a handover command to the wireless device;
  - if no acknowledgement is received from the wireless device, re-signal each of the one or more candidate network nodes to transmit a handover command to the wireless device; and
  - re-transmit a handover command to the wireless device.

8. The source network node of claim 7, wherein the processing circuit is configured to signal the one or more candidate network nodes to coordinate with the source network node for transmitting a handover command to the wireless device by signaling each of the one or more candidate network nodes to coordinate with the source network node when the measured speed is larger than a predetermined speed threshold and the estimated channel quality value is lower than a first predetermined channel quality threshold.

9. The source network node of claim 7, wherein the processing circuit is configured to signal the one or more candidate network nodes to coordinate with the source network node for transmitting a handover command to the wireless device by signaling each of the one or more candidate network nodes to coordinate with the source network node when the estimated channel quality value is lower than a second predetermined channel quality threshold.

10. The source network node of claim 7, wherein the processing circuit is configured to measure the speed of the wireless device using one of Doppler shift, time adjustment value, time delay variation, uplink (UL) reference signal, and channel quality index (CQI) report.

11. The source network node of claim 7, wherein the processing circuit is further configured to:
- receive a measurement report from a wireless device;
- measure the speed of the wireless device; and
- based on the speed of the wireless device, adjust one or more configuration parameters for use by the wireless device to send measurement reports.

12. The source network node of claim 11, wherein the one or more configuration parameters for use by the wireless device to send measurement reports comprise one or more of time to trigger value, a filter coefficient value, a3offset value, and hysteresis.

13. The source network node of claim 11, wherein adjusting the one or more configuration parameters based on the speed of the wireless device comprises:
- mapping the speed of the wireless device to a scaling factor; and
- applying the scaling factor to the one or more configuration parameters to obtain scaled parameters.

14. A method of performing a handover from a source network node to a target network node by a wireless device located in a wireless communications network, comprising:
- measuring a channel quality for a channel between the source network node and the wireless device;
- reporting the measured channel quality to the source network node;
- depending on a measured speed of the wireless device and the measured channel quality, signaling one or more candidate base stations to coordinate with the source base station for transmitting a handover command to the wireless device,
  - wherein the signaling each of the one or more network nodes to transmit a handover command to the wireless device using a cell radio network temporary identifier (C-RNTI) based on the measured channel quality;
- transmit a handover command to the wireless device;
- if no acknowledgement is received from the wireless device, re-signal each of the one or more candidate network nodes to transmit a handover command to the wireless device; and
- re-transmit a handover command to the wireless device;
- receiving a handover command from each of one or more candidate network nodes other than the target network node, said handover command directing the wireless device to hand over from the source network node to the target network node;
- sending an acknowledgement for the received handover command to the source network node; and starting a handover procedure upon receiving the handover command.

* * * * *